United States Patent
Purkayastha et al.

(10) Patent No.: US 10,888,099 B2
(45) Date of Patent: *Jan. 12, 2021

(54) GRANULATION OF A STEVIA SWEETENER

(71) Applicant: PureCircle Sdn Bhd, Kuala Lumpur (MY)

(72) Inventors: Siddhartha Purkayastha, Chicago, IL (US); Avetik Markosyan, Yerevan (AM)

(73) Assignee: PURECIRCLE SDN BHD., Kuala Lumpur (MY)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,861

(22) Filed: Sep. 14, 2018

(65) Prior Publication Data

US 2019/0021356 A1 Jan. 24, 2019

Related U.S. Application Data

(63) Continuation-in-part of application No. 16/017,643, filed on Jun. 25, 2018, now Pat. No. 10,499,661, which is a continuation of application No. 13/509,552, filed as application No. PCT/US2010/055960 on Nov. 9, 2010, now Pat. No. 10,004,245, which is a continuation-in-part of application No. 12/753,470, filed on Apr. 2, 2010, now Pat. No. 8,337,927, and a continuation-in-part of application No. 12/720,888, filed on Mar. 10, 2010, now Pat. No. 8,334,006.

(60) Provisional application No. 61/290,778, filed on Dec. 29, 2009, provisional application No. 61/260,593, filed on Nov. 12, 2009, provisional application No. 61/260,465, filed on Nov. 12, 2009.

(51) Int. Cl.
| | |
|---|---|
| A23C 9/13 | (2006.01) |
| A23L 27/30 | (2016.01) |
| A23P 10/25 | (2016.01) |
| A23G 3/36 | (2006.01) |
| A23G 3/48 | (2006.01) |
| A23G 9/32 | (2006.01) |
| A23G 9/42 | (2006.01) |

(52) U.S. Cl.
CPC .............. *A23C 9/1307* (2013.01); *A23G 3/36* (2013.01); *A23G 3/48* (2013.01); *A23G 9/32* (2013.01); *A23G 9/42* (2013.01); *A23L 27/36* (2016.08); *A23P 10/25* (2016.08); *A23V 2002/00* (2013.01); *A23V 2250/032* (2013.01); *A23V 2250/262* (2013.01); *A23V 2250/708* (2013.01)

(58) Field of Classification Search
CPC ........ A23C 9/1307; A23P 10/25; A23L 27/36; A23G 3/36; A23G 3/48; A23G 9/32; A23G 9/42; A23V 2002/00; A23V 2250/032; A23V 2250/262; A23V 2250/708
USPC ......................................... 426/473, 548, 658
See application file for complete search history.

(56) References Cited

U.S. PATENT DOCUMENTS

| 10,004,245 B2 * | 6/2018 | Purkayastha | ............ A23G 3/36 |
| 10,499,661 B2 * | 12/2019 | Purkayastha | ............ A23G 9/42 |
| 2011/0111115 A1 † | 5/2011 | Shi | |

FOREIGN PATENT DOCUMENTS

| WO | 2006/072879 A1 † | 7/2006 |
| WO | 2006/072920 A2 † | 7/2006 |

\* cited by examiner
† cited by third party

*Primary Examiner* — Leslie A Wong
(74) *Attorney, Agent, or Firm* — Jacqueline Cohen, Jason Grauch, Rachael Casey, Sarah Klosek

(57) ABSTRACT

A method for making a granulated *Stevia* sweetener is described. The resulting sweetener has a desirably high solubility level.

9 Claims, 1 Drawing Sheet

Particle Size Distribution of High Solubility Rebaudioside A Powder
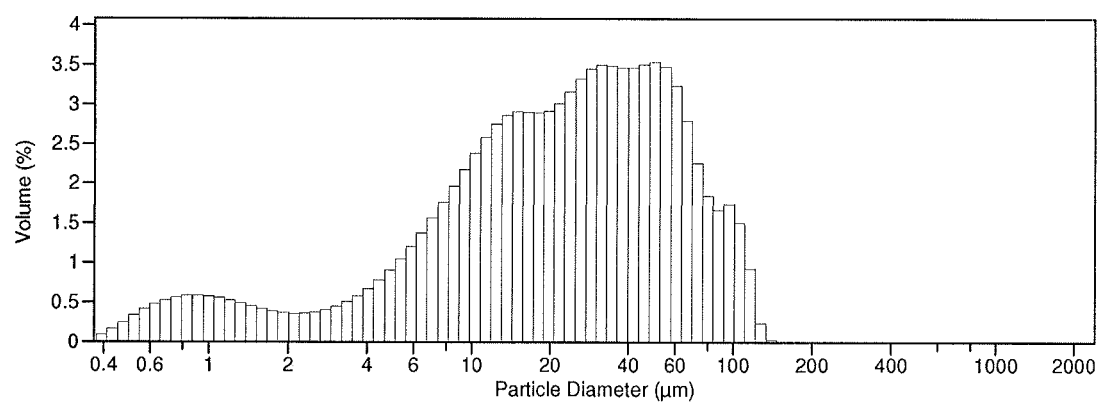

GRANULATION OF A STEVIA SWEETENER

RELATED APPLICATIONS

This application is a continuation-in-part of U.S. application Ser. No. 16/017,643, filed Jun. 25, 2018, now U.S. Pat. No. 10,499,661, which is a continuation of U.S. application Ser. No. 13/509,552, filed Jul. 30, 2012, now U.S. Pat. No. 10,004,245, which is a national stage application of International Application No. PCT/US2010/055960, filed Nov. 9, 2010, which claims the benefit of priority of U.S. Provisional Patent Application No. 61/260,465, filed Nov. 12, 2009, U.S. Provisional Patent Application No. 61/260, 593, filed Nov. 12, 2009, and U.S. Provisional Patent Application No. 61/290,778, filed Dec. 29, 2009, and which is a continuation-in-part of U.S. patent application Ser. No. 12/720,888, filed Mar. 10, 2010, now U.S. Pat. No. 8,334, 006, and U.S. patent application Ser. No. 12/753,470, filed Apr. 2, 2010, now U.S. Pat. No. 8,337,927 which applications are all hereby incorporated by reference in their entireties.

FIELD OF THE INVENTION

The invention relates to a process for the compaction and granulation of individual or combined sweet glycosides from a *Stevia rebaudiana* Bertoni plant extract, and more particularly for making a substantially dust-free granulated sweetener which may contain *Stevia* sweeteners with or without other co-ingredients such as but not limited to caloric or non-caloric sweeteners, taste modifiers and flavor modifiers.

DESCRIPTION OF THE RELATED ART

High intensity sweeteners possess a sweetness level many times exceeding that of sucrose. They are used widely in manufacturing of diet and reduced calorie food and beverage products. Although a natural caloric sweetener such as sucrose, fructose, and glucose provide the most desirable taste to consumers, they are caloric and cause increases in blood glucose levels. High intensity sweeteners, on the other hand, are essentially non-caloric, do not affect blood glucose levels, and provide little or no nutritive value.

However, high intensity sweeteners that generally are used as sugar substitutes possess taste characteristics which are different than those of sugar, such as sweet taste with different temporal profile, maximal response, flavor profile, mouthfeel, and/or adaptation behavior. For example, the sweet taste of some high intensity sweeteners is slower in onset and longer in duration than that of sugar, and thus change the taste balance of a food composition. Because of these differences, the use of high intensity sweeteners in replacing a bulk sweetener such as sugar in a food or beverage product causes an imbalance in the temporal and/or flavor profile. If the taste profile of high intensity sweeteners can be modified to impart desired taste characteristics that are similar, identical, or nearly identical to those of sugar or other natural caloric sweeteners, they can provide low calorie beverages and food products with taste characteristics that are more desirable to consumers. To attain the sugar-like temporal and/or flavor profile, several ingredients have been suggested.

On the other hand, high intensity sweeteners may have some cost and functional advantages compared to sugar. The competition between sugar and non-sugar high intensity sweeteners is strong in, for example, the soft drinks industry, especially in countries where their use and production is permitted and also in countries with overvalued sugar prices.

At present, high intensity sweeteners are used worldwide. They can be of both synthetic and natural origin.

Non-limiting examples of synthetic high intensity sweeteners include sucralose, potassium acesulfame, aspartame, alitame, saccharin, neohesperidin dihydrochalcone synthetic derivatives, cyclamate, neotame, dulcin, suosan, N-[N-[3-(3-hydroxy-4-methoxyphenyl)propyl]-L-α-aspartyl]-L-phenylalanine 1-methyl ester, N-[N-[3-(3-hydroxy-4-methoxyphenyl)-3-methylbutyl]-L-α-aspartyl]-L-phenylalanine 1-methyl ester, N-[N-[3-(3-methoxy-4-hydroxyphenyl)propyl]-L-α-aspartyl]-L-phenylalanine 1-methyl ester, salts thereof, and the like.

Non-limiting examples of natural high intensity sweeteners include Stevioside, Rebaudioside A, Rebaudioside B, Rebaudioside C, Rebaudioside E, Rebaudioside F, Steviolbioside, Dulcoside A, Rubusoside, mogrosides, brazzein, neohesperidin dihydrochalcone (NHDC), glycyrrhizic acid and its salts, thaumatin, perillartine, pernandulcin, mukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobatin, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others.

High intensity sweeteners can be derived from the modification of natural high intensity sweeteners, for example, by fermentation, enzymatic treatment, or derivatization.

At present about eleven high intensity sweeteners are used worldwide. These are acesulfame-K, alitame, aspartame, cyclamate, glycyrrhizin, NHDC, saccharin, Stevioside, sucralose, thaumatin, neotame, and Rebaudioside A.

The high intensity sweeteners can be grouped into three generations. The first generation is represented by cyclamate, glycyrrhizin and saccharin, and has a long history of use in food. The second generation includes acesulfame-K, aspartame, NHDC and thaumatin. Alitame, neotame, sucralose, Stevioside, and Rebaudioside A belong to the third generation.

The standard sweetening power associated with each high intensity sweetener is given in TABLE 1. However, when they are used in blends, the sweetening power can change significantly.

TABLE 1

Sweetness Power of High Intensity Sweeteners

| Sweetener | Sweetness power |
| --- | --- |
| Saccharose | 1 |
| Acesulfame-K | 200 |
| Alitame | 2000 |
| Aspartame | 200 |
| Cyclamate | 30 |
| Glycyrrhizin | 50 |
| NHDC | 1000 |
| Saccharine | 300 |
| Stevioside | 200 |
| Rebaudioside A | 450 |
| Thaumatin | 3000 |
| Sucralose | 600 |

On the other hand, 'natural' and 'organic' foods and beverages have become the "hottest area" in the food industry. The combination of consumers' desire, advances in food technology, and new studies linking diet to disease and disease prevention have created an unprecedented opportunity to address public health through diet and lifestyle.

A growing number of consumers perceive the ability to control their health by enhancing their current health and/or hedging against future diseases. This creates a demand for food products with enhanced characteristics and associated health benefits, specifically a food and consumer market trend towards "whole health solutions" lifestyle. The term "natural" is highly emotive in the world of sweeteners and has been identified as one of key trust, along with "whole grains", "heart-healthy" and "low-sodium". 'Natural' term is closely related to 'healthier'.

In this respect, natural high intensity sweeteners can have a better commercial potential.

*Stevia rebaudiana* Bertoni is a perennial shrub of the Asteraceae (Cornpositae) family native to certain regions of South America. The leaves of the plant contain from 10 to 20% of diterpene glycosides, which are around 150 to 450 times sweeter than sugar. The leaves have been traditionally used for hundreds of years in Paraguay and Brazil to sweeten local teas and medicines.

At present there are more than 230 *Stevia* species with significant sweetening properties. The plant has been successfully grown under a wide range of conditions from its native subtropics to the cold northern latitudes.

Steviol glycosides have zero calories and can be used wherever sugar is used. They are ideal for diabetic and low calorie diets. In addition, the sweet steviol glycosides possess functional and sensory properties superior to those of many other high intensity sweeteners.

The extract of *Stevia rebaudiana* plant contains a mixture of different sweet diterpene glycosides, which have a single base—steviol—and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of *Stevia* are Dulcoside A (0.3%), Rebaudioside C (0.6%), Rebaudioside A (3.8%) and Stevioside (9.1%). Other glycosides identified in *Stevia* extract include Rebaudioside B, C, D, E, and F, Steviolbioside and Rubusoside. Among steviol glycosides, only Stevioside and Rebaudioside A are available on a commercial scale.

The physical and sensory properties are well studied only for Stevioside and Rebaudioside A. The sweetness potency of Stevioside is around 210 times higher than sucrose, Rebaudioside A is between about 200 and about 400 times higher than sucrose, and Rebaudioside C and Dulcoside A are each around 30 times higher than sucrose. Rebaudioside A is considered to have most favorable sensory attributes of the four major steviol glycosides (TABLE 2).

TABLE 2

Physical and Sensory Properties of Steviol Glycosides

| Name | Formula | $T_{melt}$ °C. | Mol. Weight | Optical rotation $[\alpha]^{25}_D$ ($H_2O$, 1%, w/v) | Solubility in water, % | Relative sweetness | Quality of taste |
|---|---|---|---|---|---|---|---|
| Steviol | $C_{20}H_{30}O_3$ | 212-213 | 318.45 | ND | ND | ND | Very bitter |
| Steviolmonoside | $C_{26}H_{40}O_8$ | ND | 480.58 | ND | ND | ND | ND |
| Stevioside | $C_{38}H_{60}O_{18}$ | 196-198 | 804.88 | −39.3 | 0.13 | 210 | Bitter |
| Rebaudioside A | $C_{44}H_{70}O_{23}$ | 242-244 | 967.01 | −20.8 | 0.80 | 200-400 | Less Bitter |
| Rebaudioside B | $C_{38}H_{60}O_{18}$ | 193-195 | 804.88 | −45.4 | 0.10 | 150 | Bitter |
| Rebaudioside C | $C_{44}H_{70}O_{22}$ | 215-217 | 951.01 | −29.9 | 0.21 | 30 | Bitter |
| Rebaudioside D | $C_{50}H_{80}O_{28}$ | 248-249 | 1129.15 | −29.5 (ethanol) | 1.00 | 220 | Like sucrose |
| Rebaudioside E | $C_{44}H_{70}O_{23}$ | 205-207 | 967.01 | −34.2 | 1.70 | 170 | Like sucrose |
| Rebaudioside F | $C_{43}F_{68}O_{22}$ | ND | 936.99 | −25.5 (methanol) | | ND | |
| Dulcoside A | $C_{38}H_{60}O_{17}$ | 193-195 | 788.87 | −50.2 | 0.58 | 30 | Very bitter |
| Steviolbioside | $C_{32}H_{50}O_{13}$ | 188-192 | 642.73 | −34.5 | 0.03 | 90 | Unpleasant |
| Rubusoside | $C_{32}H_{50}O_{13}$ | ND | 642.73 | 642.73 | ND | 110 | Very bitter |

There are several publications on the purification of some individual steviol glycosides.

Several patents describe the general process that can be used to make a *Stevia* extract: U.S. Pat. Nos. 3,723,410; 4,082,858; 4,171,430; 4,361,697; 4,599,403; 4,892,938; 5,112,610; 5,962,678; 5,972,120; 6,031,157; 6,080,561; 7,807,206; and JP No. 01-131191; each of which is incorporated by reference in their entirety herein.

Generally, the production of a *Stevia* extract includes extraction of plant material with water or water-organic solvent mixture, precipitation of high molecular weight substances, deionization, and decolorization, purification on specific macroporous polymeric adsorbents, concentration and drying.

The glycosides from leaves can be extracted using either water or organic solvent extraction. Supercritical fluid extraction and steam distillation have been described as well. Methods for recovery of diterpene sweet glycosides from *Stevia rebaudiana* using membrane technology, and water or organic solvents, such as methanol and ethanol, also are described in the literature.

The *Stevia* extract is dried by spray drying and/or vacuum drying technology to evaporate moisture and processing solvents from the extract. The resulting powder contains very fine particles with a very low moisture content and low bulk density, which makes it very dusty to handle during food application processing.

To overcome the issues associated with the very fine particle size and dust, agglomeration technology is used to reduce the hazardous nature of dust particles and their associated handling difficulty. However most commercial or industrial agglomeration technology requires the use of a binder, which may be water or a solution of adhesive molecules.

Using wet agglomeration technology, in which a wet binding component is utilized, may adversely affect the physical and chemical characteristics of *Stevia* molecules, especially the solubility of the *Stevia* extract. The current invention is able to provide a physical form of a *Stevia* sweetener product which is much more user-friendly and reduces dust or fines, without substantially changing the physical and chemical characteristics of the different *Stevia* sweetener molecules.

To enhance the sweetness profile and to reduce the aftertaste of high intensity sweeteners, one or more co-ingredients can be combined for specific food and beverage applications. This invention also helps in delivering the high intensity sweetener and one or more co-ingredients together in a calibrated proportion in a granulated particle form, which is process- and user-friendly.

Due to the physicochemical properties of *Stevia* sweeteners, not all granulation or agglomeration techniques are suitable to produce compositions with the desired properties. In particular, it is well known that Rebaudioside A exhibits so called polymorphism (Zell et al., "Investigation of Polymorphism in Aspartame and Neotame Using Solid-State NMR Spectroscopy." *Tetrahedron* 56(6603-6616), 2000). Rebaudioside A amorphous, anhydrous and solvate forms differ significantly from each other in terms of solubility which is one of the main criteria for the commercial viability of a sweetener. In this regard, as shown in Table 3, the hydrate form of Rebaudioside A displays the lowest solubility (Prakash et al., "Development of rebiana, a natural, non-caloric sweetener." *Food Chem. Toxicol.* 46(S75-S82), 2008). It was shown that Rebaudioside A may transform from one polymorph form to another at certain conditions (U.S. patent application Ser. No. 11/556,049) as summarized in Table 3. Therefore, processes employed in Rebaudioside A manufacturing should minimize the formation of forms with undesired characteristics. Many agglomeration techniques which allow contact of a solvent with a Rebaudioside A may facilitate formation of solvate forms with undesired characteristics. In case of water or a water-containing mixture or solution coming into contact with Rebaudioside A, a hydrate form may be obtained which is characterized as the form with lowest solubility.

TABLE 3

Properties of Rebaudioside A forms (U.S. patent application No. 11/556,049)

| | Polymorph Forms | | | |
| --- | --- | --- | --- | --- |
| | Form 1 Hydrate | Form 2 Anhydrous | Form 3 Solvate | Form 4 Amorphous |
| Rate of dissolution in $H_2O$ at 25° C. | Very low (<0.2% in 60 minutes) | Intermediate (<30% in 5 minutes) | High (>30% in 5 minutes) | High (>35% in 5 minutes) |
| Alcohol content | <0.5% | <1% | 1-3% | <0.05% |
| Moisture content | >5% | <1% | <3% | 6.74% |

In addition, many processes employ binding agents or other auxiliary compounds which appear in the final product, thereby undesirably reducing the principal ingredient content.

There is therefore a significant need for a process of manufacturing granulated or agglomerated Rebaudioside A or other steviol glycosides having a desirably high solubility and containing a significant or maximized amount or concentration of the principal compound.

U.S. patent application Ser. No. 10/108,561 describes a method of producing corn starch granulate by combining the starch with granulation fluid, subjecting the mixture to wet sieving, drying and sizing. It is noted that the addition of granulation fluids in the case of *Stevia* sweeteners and Rebaudioside A will facilitate formation of low solubility polymorphs, which in turn will reduce the overall solubility of the final composition.

U.S. patent application Ser. No. 11/873,610 provides a method of producing granulated sweetening composition comprising poorly soluble polyol and hydrogenated dextrin. It is noted that including auxiliary compounds in a composition reduces the content of active ingredient.

U.S. patent application Ser. No. 11/979,530 describes a method for producing granules from powder by subjecting it to compacting force to produce a compacted mass comprising a mixture of fine particles and granules and separating the fine particles from granules by entrapping the fine particles in a gas stream.

U.S. Pat. No. 6,706,304 describes a method of preparing granular sweetener comprising Aspartame and Acesulfame K as active ingredients. The mixture of the ingredients was fed to the roller-compactor type granulator to obtain a granulated sweetener composition. It is noted that due to polymorphism of *Stevia* sweeteners and rebaudioside A, low solubility forms may be formed during such a process which will result in a final composition with an undesirably low solubility.

SUMMARY OF THE INVENTION

The invention is directed to a method for producing a sweetener comprising the steps of providing a *Stevia* sweetener powder, reducing the particle size of the *Stevia* sweetener powder, treating the *Stevia* sweetener powder under reduced pressure and elevated temperature, cooling down the treated *Stevia* sweetener powder; and holding the high solubility *Stevia* sweetener powder at low temperature to obtain a high solubility *Stevia* sweetener powder with increased solubility.

Hereinafter, unless specified otherwise, the solubility of a material is determined in reverse osmosis water at room temperature. Where the solubility is expressed as "%" it to be understood as number of grams of material soluble in 100 grams of solvent.

The invention is also directed to a method of roll compaction of a sweetener, starting with a high solubility sweetener powder, and introducing the high solubility sweetener powder to a roller compaction apparatus to produce a compacted material, introducing the compacted material to a size reducing apparatus to obtain a granule mixture, and fractioning the granule mixture through sieves of various sizes to obtain a granulated *Stevia* sweetener.

The invention further includes a high solubility *Stevia* sweetener powder, and a granulated *Stevia* sweetener.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

FIG. 1 shows the particle size distribution of a high solubility Rebaudioside A powder made in accordance with one embodiment of the invention.

DETAILED DESCRIPTION OF THE INVENTION

A process for the granulation of a *Stevia* sweetener, particularly Rebaudioside A, is described herein. The process includes the steps of reducing the particle size of a Rebaudioside A composition, drying the Rebaudioside A particles using a thermal treatment process, holding the Rebaudioside A particles under nitrogen gas, compacting the particles, then granulating them to a desired mesh size. The resulting granulated Rebaudioside A composition exhibits superior solubility and handling performance as compared to other Rebaudioside A compositions. Although the following description describes Rebaudioside A, it is to be understood that the processes and methods described herein are also suitable for use with any type of *Stevia* sweetener.

Crystalline Rebaudioside A has an inherently very low solubility, ranging from about 1%-2%. As described above, Rebaudioside A exhibits polymorphism, resulting in a variety of forms with very different characteristics and handling properties. The hydrate form has very low solubility (less than 0.2%), and is therefore not commercially viable as a sweetener. The solvate form has a solubility typically greater than 30%, but this form has only of scientific interest and cannot be used for food or beverage applications because the level of residual alcohol (1-3%) makes it unfit for use in foods and beverages. The anhydrous form has a solubility reported in literature of a maximum of up to about 30% solubility. The amorphous form has as solubility generally greater than 35%, but in the refining process, the amorphous form has to be dissolved in water and spray dried. The spray drying process necessitates the use of very diluted solutions, and spray drying itself is a very high energy consuming process, so this is not a viable option for the commercial production of Rebaudioside A.

The need exists, therefore, for a process in which a high solubility Rebaudioside A is obtained by a process which does not require significant dilution or a high energy level, and which does not result in a product having unacceptably high levels of alcohol. The process of the present invention achieves these objectives by creating a form of Rebaudioside A with a high level of solubility, but without the concomitant dilution, cost, or high alcohol content associated with other processes.

In one embodiment of the present invention, an initial material, comprising sweet glycosides of the *Stevia rebaudiana* Bertoni plant extract, which includes Stevioside, Rebaudioside A, Rebaudioside B, Rebaudioside C, Rebaudioside E, Rebaudioside F, Steviolbioside, Dulcoside A, Rubusoside and/or a mixture thereof was subjected to particle size reduction to produce a powder with mean particle size of between about 20-60 μm, preferably between about 25-40 μm. The powder with a particle size of less 20 μm exhibits low flowability reducing the efficiency of the process, whereas particles larger than 60 μm yield a product with low solubility. Any apparatus which may reduce a particle size of a solid substance, such as rotary mill, ball mill, pulverizer etc may be used for this process.

The powder thus obtained is subjected to a thermal treatment process under vacuum at between about 0-100 mbar pressure, preferably between about 5-15 mbar pressure. The duration of the thermal treatment may be between about 1-24 hours, preferably between about 2-6 hours. The temperature of the thermal treatment is between about 90-130° C., preferably between about 100-110° C. The powder is subjected to the thermal treatment for a period of time and at a temperature sufficient to remove all the water from the material, without significant product degradation.

Upon completion of the thermal treatment, preheated nitrogen is introduced into the vacuum chamber to equalize the pressure in the chamber with ambient pressure. The temperature of the preheated nitrogen in this nitrogen holding step is about 5° C. lower than the thermal treatment temperature. The vacuum chamber is connected to a vent which prevents excessive pressure buildup. The nitrogen flow is maintained at velocity which equals 1/10 of the vacuum chamber volume per minute. The nitrogen temperature is gradually decreased to about 25° C. over a period of between about 3-12 hours, preferably between about 4-6 hours. The nitrogen holding conditions are selected to provide uniform and smooth cooling conditions. Although nitrogen is described, any other substantially inert gas which will not hydrate, oxidize or otherwise chemically affect the product may be used.

In one embodiment, the high solubility powder was held under nitrogen at a temperature of between about 10-50° C., preferably between about 10-30° C. A temperature lower than 10° C. was found to result in ambient moisture condensation on the product further in the process, resulting in the low solubility hydrated form of Rebaudioside A. If the powder was treated with a temperature higher than 50° C., it resulted in an overheated compacted mass during roll compaction which quickly cooled down to the ambient temperature after compaction and yielded a Rebaudioside A product with low solubility.

The purpose of this process is to obtain a polymorph form of Rebaudioside A with a high solubility. The high solubility Rebaudioside A powder obtained by this process has a solubility that is greater than about 30%, or preferably is at least about 35% or at least about 40%.

As discussed above, the conventionally prepared anhydrous form of Rebaudioside A demonstrates a solubility of up to about 30%, and the amorphous form demonstrates a solubility that can be greater than 35%, but must be diluted significantly and spray dried when it is refined. Prior to the present invention, it has not been possible to provide a high solubility form of Rebaudioside A that is stable, easy to refine on a large scale, and does not require spray drying or other diluting processes during a commercial refining process. It was unexpectedly discovered that using the process of the present invention, including thermally treating a Rebaudioside A powder under vacuum and holding the powder under nitrogen gas, followed by dry roll compaction and granulation, a stable but very highly soluble form of Rebaudioside A can be produced.

While not intending to be bound by theory, it is believed that the high solubility form of Rebaudioside A made by the present invention is an anhydrous form of Rebaudioside A having significantly improved solubility properties as compared to a conventional anhydrous form of Rebaudioside A, and which can be refined into a granular form without the dilution or spray drying required to refine the amorphous form of Rebaudioside A.

Granulation refines the high solubility Rebaudioside A powder into a form suitable for further handling and for industrial or consumer use. Dry granulation provides numerous advantages over wet agglomeration, such as being a continuous process capable of internally recycling off-specification granules, not requiring any additional binding materials, and not requiring an additional drying step once the product is granulated.

One method of granulation is by using roll compaction, in which the powder is fed to two counter-rotating rolls which draw the powder between the rolls due to friction and compact the powder into a sheet or layer of material. Roll compaction inherently reduces the solubility of materials. Therefore, to achieve a desirable level of solubility in a granulated product, it is desirable to have a starting material with a high solubility rate prior to compaction, so that the resulting compacted and granulated material has the greatest solubility possible for a given material.

The granulated material made in accordance with the present invention advantageously yields a product with favorable characteristics such as solubility, particle size distribution and purity. In fact, it was discovered that the dissolution rate of the high solubility Rebaudioside A granulated particles of the present invention is actually greater, and even significantly greater, than the dissolution rate of the high solubility Rebaudioside A powder prior to roll compaction. While not intending to be bound by theory, it is believed that the granulation process of the present invention improves the dispersibility of the high solubility Rebaudioside A, resulting in a faster dissolution rate.

During compaction, if the roll pressure is too low, it may result in the formation of "loose" granules with poor mechanical stability. If the roll pressure is too high, it may result in "over-compacted" material which has a slower dissolution rate. In one embodiment of the present invention, the roll speed was between about 5-20 rpm, preferably between about 7-10 rpm, and more preferably about 9 rpm. The roll pressure was between about 10-60 bar, preferably between about 30-50 bar, and more preferably about 45 bar.

Numerous factors affect the solubility of a dry material, including the density of the material. It was found that suitable density values which provided the desired solubility values range from between about 0.35 to about 0.45 g/cc after roll compaction.

The compacted Rebaudioside A material can then processed by a granulating apparatus. In one embodiment, the apparatus contained two granulators—a pre-granulator and a fine granulator. The purpose of the granulators is to generate granules from compacted material produced by the roll compactor. Each granulator is equipped with rotors which press the coarse material through a U-shaped screen. If the screen size is too small, it results in an excessive amount of fine particles. If the screen size is too large, it produces large particles with a lower dissolution rate.

In one embodiment, the rotors were rotating at a rate of between about 50-2000 rpm, preferably between about 100-200 rpm, and more preferably at about 150 rpm. The granulators were equipped with screens which sizes were between about 0.5-6.0 mm, preferably between about 1-4 mm, and more preferably about 3.1 mm for the pre-granulator and about 1.6 mm for the fine granulator.

The resulting granulated Rebaudioside A product from this embodiment was fractioned on the sieves of US Mesh ##8; 10; 14; 20; 40 and 60. The results are presented in Table 4.

TABLE 4

| Particle size distribution | |
| --- | --- |
| US Mesh # | % retained |
| 8 | 0 |
| 10 | 0.1 |

TABLE 4-continued

| Particle size distribution | |
| --- | --- |
| US Mesh # | % retained |
| 14 | 26.3 |
| 20 | 39.5 |
| 40 | 24.8 |
| 60 | 6.5 |

About 2.8% of the material passed through the US Mesh #60 sieve.

The granulated Rebaudioside A sweetener obtained through the method of the present invention has a solubility ranging from about 1.0% to greater than 40%.

In one embodiment of the invention, the high solubility Rebaudiosde A powder can be mixed with other ingredients to form a Rebaudioside A blend prior to granulation. The high solubility Rebaudioside A powder is capable of being blended with other ingredients to achieve the proper distribution of all ingredients in the final product. Non-limiting examples of other ingredients which may be combined with the high solubility Rebaudioside A powder prior to granulation include: natural and synthetic high intensity sweeteners as described previously; natural sweeteners such as sucrose, fructose, glucose, maltose, lactose, tagatose, and palatinose; sugar alcohols such as erythritol; flavor modifying agents such as spices and extracts; taste modifying agents such as thaumatin, glycyrrhizin, Rebaudioside C, and Rebaudioside D; bulking agents or mouthfeel modifiers such as Fibersol®, soluble corn fiber, gum Arabic, pectin, isomaltooligosaccharide; and combinations thereof.

It has been discovered that by balancing the use of other ingredients in combination with Rebaudioside A, the flavor and temporal profiles of the resulting sweetener can be improved. For example, while not intending to be bound by theory, it is believed that using a very small amount of a taste modifying agent may serve to saturate or block the specific taste buds during the early part of consumption, thus making those taste buds unavailable for the transmittal of specific taste signals to the brain during the consumption of the rest of the beverage or food. The taste modifying agent itself may have a very high degree of the particular taste, such as bitterness, which is to be blocked by saturating the receptors on the tongue with that taste.

The sweetness profile of Rebaudioside A may also be enhanced with the use of sugar, such as cane or beet sugar. Although sugar and *Stevia* sweeteners have different melting characteristics and solubility, it is believed that the use of the dry roll compaction granulation process of the present invention results in a reduced calorie sugar-containing sweetener composition which is uniform and provides a consistent dispersion when used in a food or beverage application.

The following examples illustrate various embodiments of the invention. It will be understood that the invention is not limited to the materials, proportions, conditions and procedures set forth in the examples, which are only illustrative.

EXAMPLE 1

Preparation of High Solubility Rebaudioside A 100 kg of Rebaudioside A, containing Stevioside 0.2%, Rebaudioside C 0.2%, Rebaudioside F 0.3%, Rebaudioside A 97.5%, Rebaudioside D 1.1%, Rebaudioside B 0.5%, all percentages being on a percent dry weight basis, and having water solubility of 1.6% was placed into rotary blade milling machine and pulverized for 20 minutes. The resulting powder was analyzed by Beckman Coulter LS 13 320 Laser Diffraction Particle Size Analyzer. The results are summarized in Table 5.

TABLE 5

Powder Laser Diffraction Analysis Results

| Operation Mode | Volume Statistics |
|---|---|
| Calculations: | from 0.375 μm to 2000 μm |
| Mean: | 31.07 μm |
| Median: | 23.11 μm |
| Mean/Median ratio: | 1.344 |
| Mode: | 50.22 μm |
| S.D.: | 27.15 μm |
| Variance: | 737.4 μm$^2$ |
| C.V.: | 87.4% |
| Distribution | |
| <10% | 3.356 μm |
| <25% | 10.11 μm |
| <50% | 23.11 μm |
| <75% | 45.76 μm |
| <90% | 70.19 μm |

The obtained powder was loaded into a 1000 L rotary vacuum dryer and dried at 105° C. at 10 mbar pressure for 3 hours. After 3 hours, preheated nitrogen at 100° C. was introduced into the vacuum chamber till ambient pressure was reached. Upon reaching ambient pressure, the vacuum dryer was connected to a vent and the nitrogen flow was continued at 100 L/min for a 4-hour time period. The temperature of the nitrogen gas was gradually decreased by 5° C. decrements until reaching 25° C. during the course of the 4-hour time period. A sample of the powder was withdrawn from the dryer and the solubility tested in deionized water at room temperature. The solubility was 41.1%, and the dissolution time was 7 minutes. The particle size distribution of the high solubility Rebaudioside A powder is shown in FIG. 1.

EXAMPLE 2

Granulation of Rebaudioside A 50 kg of high solubility Rebaudioside A prepared according to EXAMPLE 1 was placed into a 500 L double cone powder mixer and nitrogen at 10° C. was fed to the vessel for 1 hour. The powder was transferred to Alexanderwerk WP 50N/75 roller compactor. The compactor was operating at 9 rpm and 45 bar pressure. The compacted mass was fed to a pre-granulator and a fine granulator with rotors at rotating at 150 rpm. The screen size for the pre-granulator was 3.1 mm and for the fine granulator was 1.6 mm. The "overs" (particles that are too large) and "fines" (particles that are too small) were separated by top screen having a screen size of US Mesh 10 and bottom screen of US Mesh 40. The % ratio of "overs":"product":"fines" was 0.3%: 72.1%:27.6% respectively.

EXAMPLE 3

Granulation of Rebaudioside A 50 kg of high solubility Rebaudioside A prepared according to EXAMPLE 1 were granulated according to procedure of EXAMPLE 2. The compactor was operating at 18 rpm and 65 bar pressure. The compacted mass was fed to a pre-granulator and a fine granulator with rotors at rotating at 300 rpm. The screen size for the pre-granulator was 5 mm and for the fine granulator was 3 mm.

EXAMPLE 4

Granulation of Rebaudioside A 50 kg of high solubility Rebaudioside A prepared according to EXAMPLE 1 was granulated according to procedure of EXAMPLE 2. The compactor was operating at 9 rpm and 45 bar pressure. The compacted mass was fed to pre-granulator and fine granulators with rotors at rotating at 150 rpm. The screen size for the pre-granulator was 2 mm and for the fine granulator was 0.5 mm. The "overs" and "fines" were separated by top screen of US Mesh #10 and bottom screen of US Mesh #40. The yield of product was 34%, whereas 66% of product passed through US Mesh #40. Subsequent sifting of the material that passed through the US Mesh #40 through a US Mesh #80 sieve resulted in 28% of powder passing through the US Mesh #80.

EXAMPLE 5

Dissolution Rate of High Solubility Rebaudioside A

Four batches of high solubility Rebaudioside A powder were used for preparing the granulated product by using the roll compaction technology as described above. All powder and granulated samples were tested for their solubility and dispersion time. Testing was conducted by adding 5.0 g of powder or granulated high solubility Rebaudioside A in 500 ml water at ambient temperature. The mixture was then agitated with a magnetic stirrer to create a significant vortex for proper mixing. The dissolution rate was timed on a stop watch starting as soon as the high solubility Rebaudioside A was added directly to agitated water. The data, summarized in Table 6, showed that granulation shortened the dissolution time (the time to have clear solution) without any loss of solubility.

TABLE 6

Dissolution Times and Rates of High Solubility Rebaudioside A Powder and Granular Form

| Batch | Dissolution Time (Powder) | Dissolution Rate (Powder) | Dissolution Time (Granular) | Dissolution Rate (Granular) | % Rate Increase from Powder |
|---|---|---|---|---|---|
| 1 | 7 min 11 sec | 0.70 g/min | 6 min 35 sec | 0.76 g/min | 8.6% |
| 2 | 10 min 5 sec | 0.50 g/min | 4 min 41 sec | 1.07 g/min | 114% |
| 3 | 8 min 35 sec | 0.58 g/min | 5 min 36 sec | 0.90 g/min | 55% |
| 4 | 13 min 12 sec | 0.38 g/min | 5 min 11 sec | 1.00 g/min | 163% |

The process of the present invention resulted in a unique Rebaudioside A polymorph which demonstrated an unexpectedly higher degree of solubility in water than other polymorphic forms. Although the foregoing embodiments describe the use of Rebaudioside A, it is to be understood that any *Stevia*-based sweetener may be used and prepared in accordance with this invention, and all *Stevia*-based sweeteners are contemplated to be within the scope of the present invention.

EXAMPLE 6

Additional Particle Size Distributions

An initial material, comprising sweet glycosides of the Stevia rebaudiana plant extract, which includes one or more of Stevioside, Rebaudioside A, Rebaudioside B, Rebaudioside C, Rebaudioside D, Rebaudioside E, Rebaudioside F, Rebaudioside M, Rebaudioside N, Rebaudioside O, Steviolbioside, Dulcoside A, Rubusoside, other minor glycosides found in Stevia rebaudiana plants, and/or a mixture thereof, was subjected to particle size reduction to produce a powder with mean particle size of less than about 260 µm. The powder had a solubility in water at ambient temperature (between about 65-75° F. or about 18-24° C.) of at least about 1 g per 100 g of water, at least about 5 g per 100 g of water, at least about 10 g per 100 g of water, at least about 15 g per 100 g of water, at least about 20 g per 100 g of water, at least about 25 g per 100 g of water, or at least about 30 g per 100 g of water. The powder was then granulated using the roll compaction method as described above. Additional particle size distributions of the granulated product were obtained.

The particle sizes obtained generally ranged from about 140 µm to about 680 µm, more specifically from about 180 µm to about 600 µm, from about 180 µm to about 420 µm, from about 150 µm to about 420 µm, or from about 150 µm to about 260 µm. Each of the granulated samples had a greater dissolution rate than its corresponding powder form. Tables 7a-e show particle size distributions based on US Mesh sieve sizes as indicated in the Tables. Microns (µm) listed in the tables are approximate sieve size openings.

TABLE 7a

| Particle Size Distribution % Retained on Sieve Sample A | |
|---|---|
| # 30 (600 µm) | >14% |
| # 60 (260 µm) | >90% |
| # 80 (180 µm) | >99% |
| Pass thru # 80 | <1% |

For Sample A, greater than about 90% of the granulated products had a particle size greater than 260 µm.

TABLE 7b

| Particle Size Distribution % Retained on Sieve Sample B | |
|---|---|
| # 40 (420 µm) | <5% |
| # 60 (260 µm) | <60% |
| # 100 (150 µm) | >95% |
| Pass thru # 100 | <5% |

For Sample B, greater than about 95% of the granulated products had a particle size greater than 150 µm and less than about 60% of the sample had a particle size greater than 260 µm.

TABLE 7c

| Particle Size Distribution % Retained on Sieve Sample C | |
|---|---|
| # 40 (420 µm) | <65-80% |
| # 60 (260 µm) | >95% |

TABLE 7c-continued

| Particle Size Distribution % Retained on Sieve Sample C | |
|---|---|
| # 80 (180 µm) | >99% |
| Pass thru #80 | <1% |

For Sample C, greater than about 95%, of the granulated products had a particle size greater than about 260 µm based on the sieve opening sizes. Less than between about 65% to 80% had a particle size greater than 420 µm.

TABLE 7d

| Particle Size Distribution % Retained on Sieve Sample D | |
|---|---|
| # 40 (420 µm) | ≤1% |
| # 60 (260 µm) | ≤15% |
| # 100 (150 µm) | ≤95% |
| Pass thru # 100 | ≤5% |

For Sample D, less than or about 95% of the granulated products had a particle size larger than 150 µm based on the sieve opening sizes.

TABLE 7e

| Particle Size Distribution Sample E | |
|---|---|
| # 16 (1200 µm) | <1% |
| # 30 (600 µm) | <14% |
| # 60 (260 µm) | <90% |
| # 80 (180 µm) | >99% |
| Pass thru # 100 (150 µm) | <1% |

For Sample E, greater than about 99% of the granulated products had a particle size larger than 180 µm, and less than about 90% of the granulated products had a particle size larger than about 260 µm, based on the sieve opening sizes.

EXAMPLE 7

Dissolution Rates

Dissolution rates for selected samples of Rebaudioside A were evaluated. The samples were either in powder form having a particle size of less than about 260 µm, or in granular (granulated) form having the granular particle size distributions described in Example 6 corresponding to the Sample identification listed below. Dissolution rates were determined using the methodology of Example 5, and the results are provided in Table 8.

TABLE 8

Dissolution Times and Rates of Rebaudioside A Powder and Granular Form

| Sample ID | Dissolution Time (Powder) | Dissolution Rate (Powder) | Dissolution Time (Granular) | Dissolution Rate (Granular) | % Rate Increase from Powder |
|---|---|---|---|---|---|
| A | 3 min 00 sec | 1.67 g/min | 2 min 32 sec | 1.97 g/min | 18.42 |
| B | 3 min 02 sec | 1.65 g/min | 48 sec | 6.25 g/min | 279.17 |

TABLE 8-continued

Dissolution Times and Rates of Rebaudioside A Powder and Granular Form

| Sample ID | Dissolution Time (Powder) | Dissolution Rate (Powder) | Dissolution Time (Granular) | Dissolution Rate (Granular) | % Rate Increase from Powder |
|---|---|---|---|---|---|
| D | 3 min 00 sec | 1.67 g/min | 50 sec | 6.00 g/min | 260.00 |
| E | 3 min 01 sec | 1.66 g/min | 2 min 52 sec | 1.74 g/min | 5.23 |

The percent increase in dissolution rate of the granular product as compared to the powder form ranges from about 5% to about 280%. In certain embodiments, the percent increase in dissolution rate of a steviol glycoside composition as a granular product as compared to its powder form at an ambient temperature is at least about 10%, 20%, 50%, 100%, 150%, 200% or 250%.

Although the invention and its advantages have been described in detail, it should be understood that various changes, substitutions and alterations can be made herein without departing from the spirit and scope of the invention as defined by the appended claims. Moreover, the scope of the application is not intended to be limited to the particular embodiments of the invention described in the specification. As one of ordinary skill in the art will readily appreciate from the disclosure of the invention, the compositions, processes, methods, and steps, presently existing or later to be developed that perform substantially the same function or achieve substantially the same result as the corresponding embodiments described herein may be utilized according to the invention.

We claim:

1. A method for producing a sweetener comprising the steps of:
   A) providing a *Stevia* sweetener powder;
   B) reducing the particle size of the *Stevia* sweetener powder to a particle size of less than 260 μm;
   C) treating the *Stevia* sweetener powder under reduced pressure of between about 0 mbar to 100 mbar and an elevated temperature of between about 90-130° C.;
   D) cooling down the treated *Stevia* sweetener powder to a low temperature of about 25° C.; and
   E) holding the cooled *Stevia* sweetener powder at the low temperature to obtain a high solubility *Stevia* sweetener powder with an increased solubility of at least about 1 g per 100 g of water at ambient temperature; and
   F) introducing the high solubility *Stevia* sweetener powder to a roll compaction apparatus to produce a compacted material; introducing the compacted material to a size reducing apparatus to obtain a granule mixture; and fractionating the granule mixture to obtain a granulated *Stevia* sweetener having a particle size ranging from about 140 μm to about 680 μm and having a dissolution rate greater than a dissolution rate of the high solubility *Stevia* powder.

2. The method of claim 1, wherein the dissolution rate of the granulated *Stevia* sweetener is at least about 0.75 grams per minute.

3. The method of claim 1 wherein *Stevia* sweetener is selected from a group consisting of Stevioside, Rebaudioside A, Rebaudioside B, Rebaudioside C, Rebaudioside D, Rebaudioside E, Rebaudioside F, Rebaudioside M, Rebaudioside N, Rebaudioside O, Steviolbioside, Dulcoside A, Rubusoside, other minor glycosides found in *Stevia rebaudiana* plants, and a mixture thereof.

4. The method of claim 1, wherein cooling the treated *Stevia* powder comprises introducing preheated nitrogen gas into a vacuum chamber and gradually reducing the nitrogen gas temperature.

5. The method of claim 1, wherein the roll compaction apparatus operates at between about 5 rpm and about 20 rpm, and at a roll pressure of between about 10 bar to about 60 bar to produce the compacted material; and the size reducing apparatus comprises a set of sequentially located granulators equipped with rotors rotating at between about 50 rpm to about 2000 rpm to obtain the granule mixture.

6. The method of claim 1 wherein the *Stevia* sweetener powder is selected from a group consisting of: Stevioside, Rebaudioside A, Rebaudioside B, Rebaudioside C, Rebaudioside D, Rebaudioside E, Rebaudioside F, Rebaudioside M, Rebaudioside N, Rebaudioside O, Steviolbioside, Dulcoside A, Rubusoside, other minor glycosides found in *Stevia rebaudiana* plants, and a mixture thereof.

7. The method of claim 1, further comprising the step of combining the *Stevia* sweetener powder with an additional ingredient before introducing the powder to the roll compaction apparatus.

8. The method of claim 1, wherein the additional ingredient is selected from the group consisting of: a high intensity sweetener; a natural sweetener; a sugar alcohol; a flavoring agent; a flavor modifying agent; a taste modifying agent; a bulking agent or a combination thereof.

9. The method of claim 1, wherein the dissolution rate of the granulated *Stevia* sweetener is at least about 5% greater than the dissolution rate of the high solubility *Stevia* powder.

* * * * *